United States Patent [19]
Pricer et al.

[11] Patent Number: 5,902,044
[45] Date of Patent: May 11, 1999

[54] INTEGRATED HOT SPOT DETECTOR FOR DESIGN, ANALYSIS, AND CONTROL

[75] Inventors: Wilbur Pricer, Charlotte; Kenneth Joseph Goodnow, Essex Junction; Michel S. Michail, S. Burlington; Janak Ghanshyambhai Patel, S. Burlington; Sebastian T. Ventrone, S. Burlington, all of Vt.

[73] Assignee: International Business Machines Corporation, Armonk, N.Y.

[21] Appl. No.: 08/883,911

[22] Filed: Jun. 27, 1997

[51] Int. Cl.⁶ .................................. G01K 3/14; G01K 7/00
[52] U.S. Cl. ........................ 374/112; 374/137; 374/166
[58] Field of Search ................................... 374/166, 112, 374/137

[56] References Cited

U.S. PATENT DOCUMENTS

| | | |
|---|---|---|
| 4,682,857 | 7/1987 | Tan . |
| 4,779,161 | 10/1988 | DeShazo, Jr. . |
| 4,899,180 | 2/1990 | Elhatem et al. . |
| 5,008,736 | 4/1991 | Davies et al. . |
| 5,046,858 | 9/1991 | Tucker ..................................... 374/166 |
| 5,052,816 | 10/1991 | Nakamura et al. ...................... 374/137 |
| 5,063,307 | 11/1991 | Zommer . |
| 5,171,091 | 12/1992 | Kruger et al. ........................... 374/166 |
| 5,261,747 | 11/1993 | Deacutis et al. ........................ 374/137 |
| 5,326,170 | 7/1994 | Moslehi et al. . |
| 5,389,738 | 2/1995 | Piosenka et al. . |
| 5,406,630 | 4/1995 | Piosenka et al. . |
| 5,444,637 | 8/1995 | Smesny et al. . |
| 5,466,614 | 11/1995 | Yakura et al. . |
| 5,820,263 | 10/1998 | Ciobanu ................................... 374/112 |

*Primary Examiner*—Diego Gutierrez
*Assistant Examiner*—Quyen Doan
*Attorney, Agent, or Firm*—Schmeiser, Olsen & Watts; Mark F. Chadurjian

[57] ABSTRACT

A matrix of thermal sensors is provided for accurately evaluating the thermal characteristics of an integrated circuit. The integrated circuit is evenly divided into a plurality of sectors in which a thermal comparison to a known thermal mass will be performed. Each sector includes at least one dual cell comprising a local thermal sensor for providing an output corresponding to a local temperature of the integrated circuit in that sector, and a background thermal sensor. The outputs of selective ones of the background thermal sensors are combined to provide a signal corresponding to a background temperature of the integrated circuit. A decoder/enabler arrangement is used to selectively gate the output of a specific local thermal sensor in a sector to a difference circuit where it is compared to the collective output of selected ones of the background sensors to generate a thermal measurement of the sector under test.

21 Claims, 4 Drawing Sheets

INTEGRATED HOT SPOT DETECTOR FOR DESIGN, ANALYSIS, AND CONTROL

FIELD OF THE INVENTION

This invention is in the field of integrated circuits, and is specifically directed to a system for accurately evaluating the thermal characteristics of an integrated circuit.

BACKGROUND OF THE INVENTION

Microprocessor manufacturers are constantly faced with the conflicting requirements of greater processor speed and lower power consumption (i.e., lower heat output). With the packing density of silicon increasing toward tens of millions of transistors per die, microprocessors have become vast metropolises of functions, where many operations can be performed concurrently. Although this has resulted in an increase in processor speeds, the increased complexity and size have made accurate thermal analysis increasingly difficult to achieve.

In a simple integrated circuit, power consumption is typically a function of a switching ratio multiplied by the number of gates, at a known voltage and frequency. However, due to the increased design complexity and concurrent functionality of a microprocessor, the switching ratio is more a function of the actual code patterns being run. Further, since the operational environment determines the cooling rate from the package and external thermal protection, these factors must also be considered. One can attempt to build software models of the transistors, the thermal environment, and a subset of possible code patterns. This, however, is a difficult task to complete for numerous reasons, including the fact that code patterns can only be a small subset of the actual code patterns being run.

One alternative is to analyze the thermal characteristics of the device by testing it while it is still at the wafer level. This has been done using infrared scopes, or by placing temperature sensitive liquids directly on the wafer. Both of these techniques have drawbacks which reduce the accuracy of the analysis. For example, these techniques are at the wafer level, and do not accurately model how the packaged hardware is going to perform, the level of accuracy for area resolution is low, and the number of code patterns that can be applied is limited to tester throughput.

SUMMARY OF THE INVENTION

In order to overcome the deficiencies of the prior art, the present invention uses a matrix of thermal sensors to accurately evaluate the thermal characteristics of an integrated circuit at the wafer level, the packaging level, or in an actual system. In the present invention, the integrated circuit is evenly divided into a plurality of sectors, preferably square in area, in which a thermal comparison to a known thermal mass will be performed. Each sector includes at least one dual cell comprising a local thermal sensor for providing an output corresponding to a local temperature of the integrated circuit in that sector, and a background thermal sensor for collectively providing the average temperature for the entire integrated circuit. The outputs of selective ones of the background thermal sensors are combined to provide a signal corresponding to a background temperature of the integrated circuit. A decoder/enabler is used to selectively gate the output of a local thermal sensor in a specific sector to a difference circuit where it is compared to the collective output of selected ones of the background sensors to generate a thermal measurement of the sector under test. Read out of the thermal measurements can be accomplished using a similar technique to a Built-In-Self-Test (BIST) engine. In this manner, every sector can be evaluated while code or test patterns are running in an actual system, at wafer, or at the module tester or system level. Now, unlike prior art thermal evaluation methods, actual measurements of the thermal activity at every sector of an integrated circuit can be measured.

The output of the thermal measurements for each sector can be sent to a digital converter for power analysis. This data can be collected at a probe point, in a register to be scanned out, or brought out directly to output pins. By using this data, the sector location can be mapped to the corresponding function transistors of the integrated circuit located in that sector area. In this manner, the power curves for every sector of the chip can be determined. For designs that exceed allowable power allocations, the circuit designer can be given a complete breakdown of the operating conditions and logic that caused the excess power consumption at specific sector locations(s). This data allows the designer to power tune this function, and maintain functionality. In addition, if a power model exists, the sector analysis can be used to correlate the power model to the design, and then to properly determine the right code or test vectors to apply to the model. Then, once any design change is made, any corresponding drop in power consumption can be measured. Alternately, this invention can be used to thermally characterize various chip carrier packages.

The present invention remains useful long after the design phase and product test have been completed. Sector thermal analysis can continue to be performed during the packaging stage, or on an integrated circuits under actual operating conditions within a system. Power consumption can be monitored, and the activity of those sectors which are exceeding peak power limits can be selectively controlled. For example, a portion of a microprocessor (or other integrated circuit such as a digital signal processor (DSP)) can be run at a decreased throughput, or depowered or declocked, whenever the temperature within that portion of the integrated circuit exceeds a predetermined thermal limit.

The present invention provides a large array of thermal sensors for detecting hot spots on the surface of the integrated circuit, and for accurately determining their positions. Preferably, the array of sensors is dense enough to detect fine granularity in the thermal contour, yet simple and sparse enough to negligibly effect the cost and performance of the overall integrated circuit.

For areal, wireability and cost comparisons, it can be assumed, for example, that the integrated circuit contains an array of gates, and that the thermal sensors are arranged in such a way that they occupy gate sites within an array of gates. As detailed below, the cost and performance impact of the present invention on an integrated circuit containing such an array of gates is negligibly small. The cost and performance impact on more complex circuit designs is also negligible.

If one column in ten is populated with thermal sensors within the array of gates, and only one row in ten within a populated column is itself populated with thermal sensors, only 1% of the potential gate sites is spared to thermal sites. The areal overhead is, thus, about 1%. Note that no gate site is more than seven gate sites removed from a thermal sensor. Each thermal site is populated with a local thermal sensor to detect "hot spots." However, fewer than 10% of the thermal sites are also populated with a background thermal sensor. This facilitates the current comparison between the outputs of one isolated local thermal sensor and "many" background thermal sensors.

BRIEF DESCRIPTION OF THE DRAWINGS

The objects and features of the present invention will best be understood from a detailed description of preferred embodiments thereof selected for the purposes of illustration and shown in the accompanying drawings, in which.

DETAILED DESCRIPTION OF THE PREFERRED EMBODIMENTS

Figure 1:
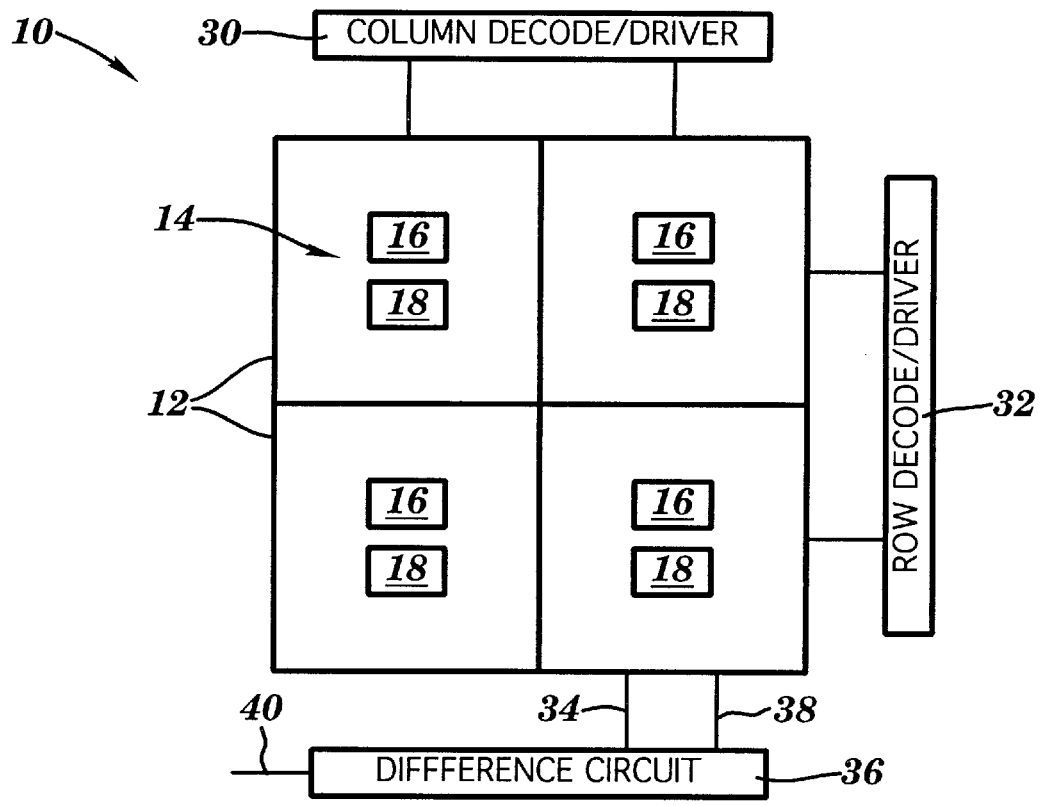
FIG. 1 illustrates an integrated circuit divided into a plurality of sectors, wherein each sector includes at least one dual cell comprising a local "hot spot" thermal sensor and a background thermal sensor.

Referring first to FIG. 1, there is illustrated an integrated circuit 10 which has been divided into a plurality of sectors 12 for thermal analysis using the integrated hot spot detector of the present invention. For simplicity of description, the integrated circuit 10 has been divided into four square sectors 12 of equal area. Of course, the number of sectors used in a particular application of the present invention is dependent on the requirements of the user, the size and complexity of the integrated circuit, and other factors.

Each sector 12 includes at least one dual cell 14 comprising a local "hot spot" thermal sensor 16 and a background thermal sensor 18. The sensors 16 and 18 are positioned interstitially within, and independently of, the circuits (not shown) contemporaneously formed on the integrated circuit 10 to allow monitoring of the temperature of the integrated circuit in its regular operating environment.

Figure 2:
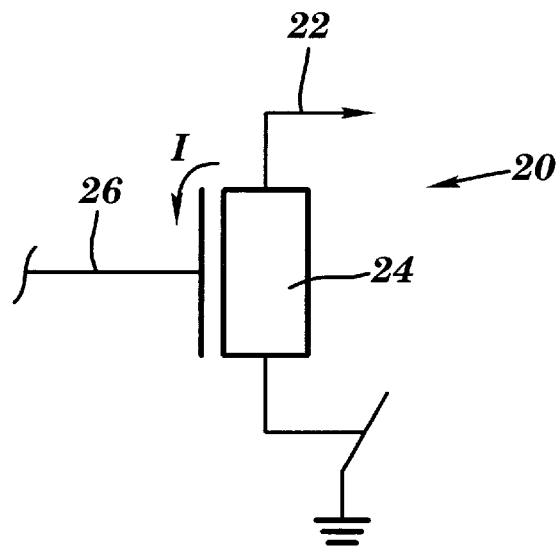
FIG. 2 illustrates a thermal sensor for use in the present invention.

One of many possible embodiments of a thermal sensor 20 suitable for use as the local thermal sensor 16 and/or the background thermal sensor 18 in the present invention is shown in FIG. 2. Preferably, the thermal sensor 20 provides an output current I on line 22 which is proportional to temperature. The thermal sensor 20 illustrated in FIG. 2 includes a temperature sensitive n-channel field effect transistor (NFET) 24 which provides an output current I proportional to temperature when selected via gate 26. Transistor 24 is preferably biased in the sub-threshold region.

Again referring to FIG. 1, an X/Y decoding system including a column decode/driver 30 and a row decode/driver 32 is used to select a specific local thermal sensor 16 for thermal analysis. When selected, the output current of the local thermal sensor 16 is provided as an input 34 to a difference circuit 36 for comparison with a signal 38 corresponding to the background temperature of the integrated circuit 10. This signal is generated by summing the outputs of selected ones of the background thermal sensors 18 distributed across the integrated circuit 10. The sizes of the two sensors 16, 18, are intentionally unbalanced to facilitate the comparison of a "local temperature" within a sector 12 as provided by the output of a local thermal sensor 16 located in that sector, with the "background temperature" as collectively provided by the selected ones of the background thermal sensors 18.

The output 40 of the difference circuit 36 corresponds to a temperature difference between a local temperature in a specific sector of the integrated circuit 10 and the background temperature of the integrated circuit. As such, a temperature analysis of the integrated circuit 10 can easily be performed by observing the output 40 of the difference circuit 36 while sequentially addressing a local thermal sensor 16 in each sector 12 of the integrated circuit 10. For example, the temperature variation across the integrated circuit can be displayed on a cathode ray tube (CRT) as a color contour map. Other techniques for analyzing the output of the difference circuit 36 to determine temperature variations across the integrated circuit 10 can also be used without departing from the scope of the present invention as set forth in the claims.

Figure 3:
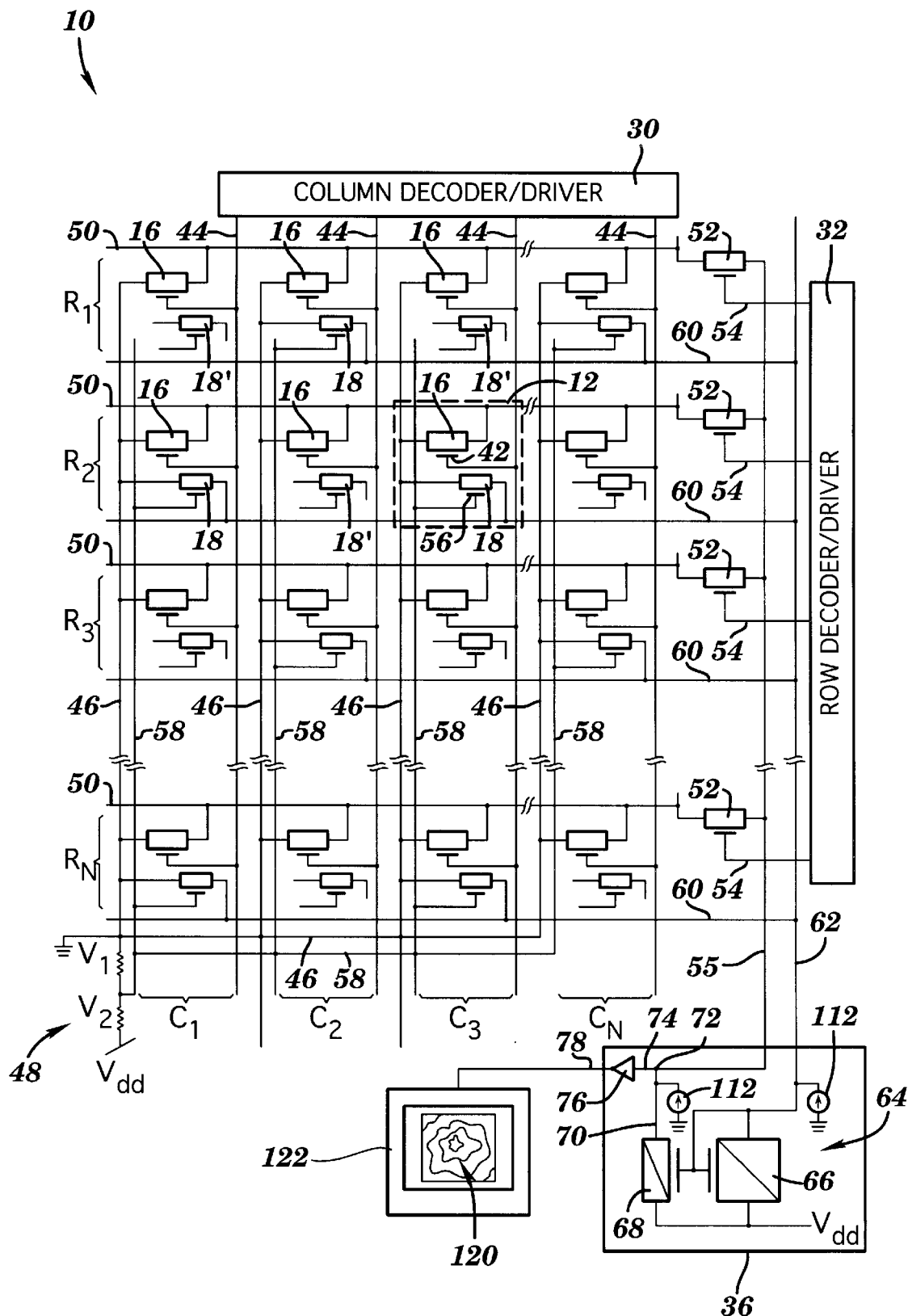
FIG. 3 provides a detailed illustration of an integrated hot spot detector in accordance with a first embodiment of the present invention.

A detailed illustration of an integrated hot spot detector in accordance with a first embodiment of the present invention is illustrated in FIG. 3.

In this example, an integrated circuit 10 is divided into $N^2$ sectors 12 of equal area, and an N×N sensor array of dual cells each including a local thermal sensor 16 and a background thermal sensor 18 are evenly distributed throughout the sectors 12. However, only a selected plurality of the background thermal sensors 18 are actually used for a thermal analysis of the integrated circuit. It should be noted that in an actual application of the present invention, those sites not used to determine the background temperature of the integrated circuit 10 do not have to be populated with a background thermal sensor 18. In fact, either one, or both thermal sensors 16, 18, may in actuality be populated.

Each sector 12 includes a local thermal sensor 16. The gate 42 of each local thermal sensor 16 in a column of the array is connected to one of the select lines 44 of the column decoder/driver 30. The source of each local thermal sensor 16 in the array is held at a voltage $V_1$, which is at or near ground, on lines 46.

A column decoder/driver 30 outputs a signal on one of the lines 44 to selectively drive all of the local thermal sensors 16 located in a single column ($C_1, C_2, \ldots, C_N$) of the sensor array. The output current from the drain of each local thermal sensor 16 in the selected column of the sensor array is individually available on a respective one of a plurality of lines 50.

A plurality of FET switches 52 are used to selectively direct the output current on a single line 50 in a specific row ($R_1, R_2, \ldots, R_N$) of the array to a difference circuit 36. The FET switches 52 are individually driven by a gating signal provided by a row decoder/driver 32 on lines 54. In this way, the output of a single local temperature sensor 16 can be isolated on line 55 for analysis.

In this example, each sector 12 of the integrated circuit 10 includes either an active background thermal sensor 18 or an unused background thermal sensor 18', with an active background thermal sensor 18 populating every other thermal site in the array. Of course, the unused background thermal sensors 18' are unnecessary and can be eliminated if desired. Such a checkerboard pattern of active background thermal sensors 18 provides a uniform measurement of the background temperature across the surface of the integrated circuit 10. Other configurations employing a higher or lower density of background thermal sensors 18 can also be used.

The gates 56 of the active background thermal sensors 18 are interconnected via lines 58, and are held at voltage $V_2$ by the resistive divider arrangement 48. As with the local thermal sensors 16, the source of each background thermal sensor 18 in the array is held at a voltage $V_1$ at or near ground on lines 46.

The output currents of the background thermal sensors 18 are continuously available on lines 60, and are summed at node 62. The current at node 62 is directed into the difference circuit 36 for comparison with the output current of a specific local thermal sensor 16 selected through the coaction of the column decode/driver 30 and the row decode/driver 32. Thus, the temperature at a single, selected thermal site within the sensor array can be compared with a background temperature derived from a plurality of the background thermal sensors 18.

The difference circuit 36 employs a current mirror 64 comprising a pair of p-channel field effect transistors (PFET) 66, 68. The current mirror 64 is used to balance the total current received from a plurality of the background thermal sensors 18 with the output current of a single local thermal detector 16. As known in the art, the reference current of the current mirror (current at node 62) is reflected by the output current on line 70 if the transistors 66, 68, are in a 1:1 matching geometry ratio. However, by varying the relative geometries of the transistors 66, 68, the relative magnitudes of the output current on line 70 and the output current of a single local thermal sensor 16 can be brought into balance. This allows a local "hot spot" temperature to be more easily compared to the background temperature of the integrated circuit.

The output current of the current mirror 64 on line 70 is summed (i.e., "compared") at node 72 with the output current of the selected local thermal sensor 16 on line 55, and the difference signal 74 is passed through an amplifier 76 where it is available on line 78 for analysis. The signal on line 78 may be treated as an analog signal which is digitized by a standard analog to digital converter, and then stored in a register for further analysis.

The difference signal 74 rendered by transistors 66 and 68, and then amplified by amplifier 76, is most easily treated thereafter as a digital binary signal (on line 78). In the simplest implementation, the signal on line 78 indicates if the selected local thermal sensor 16 is hotter or cooler than the background temperature of the integrated circuit as determined by the background thermal sensors 18.

For purposes of the CRT display or other analysis, it may be desired to display how much hotter or cooler a selected local thermal sensor 16 is than the background temperature of the integrated circuit. This can be accomplished with a repetitive interrogation of the local thermal sensors 16, each time using a different threshold. A simple means for implementing this adjustable threshold is with a variable current source 112 attached to node 70 or node 62. The variable current source 112 may be controlled by an external analog or digital signal. A color contour map 120 of the temperature variation across the integrated circuit chip can be provided to a user on a display 122.

The output currents of the thermal sensors 16, 18 are typically in the nanoamp to picoamp range, and, as a result, may be disrupted by DC ground currents. To obviate this disruption, the output from the thermal sensors 16, 18 can be subjected to low pass filters set at many orders of magnitude below the clock frequency.

The embodiment of the present invention shown in FIG. 3 requires three wires in one direction and two wires in the other for each sensor site. Once again, using a typical array of gates for comparison, we can expect about 11 wires per gate site and about four levels of metal for wiring for a total of 440 wiring channels. Thus, the embodiment of FIG. 3 requires 5 out of 440 wiring channels.

Figure 4:
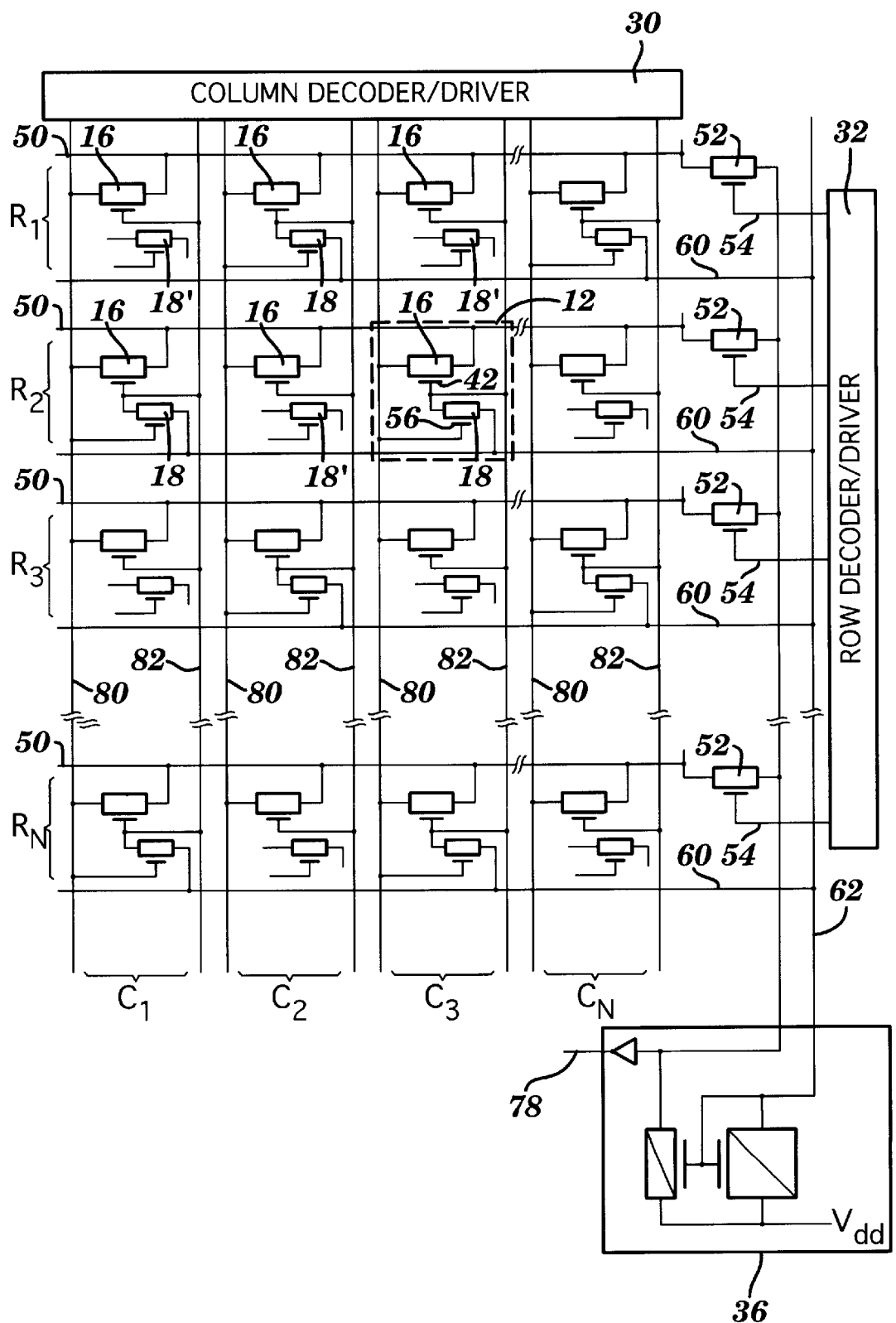
FIGS. 4 and 5 illustrate additional embodiments of the integrated hot spot detector of the present invention.
Figure 5:
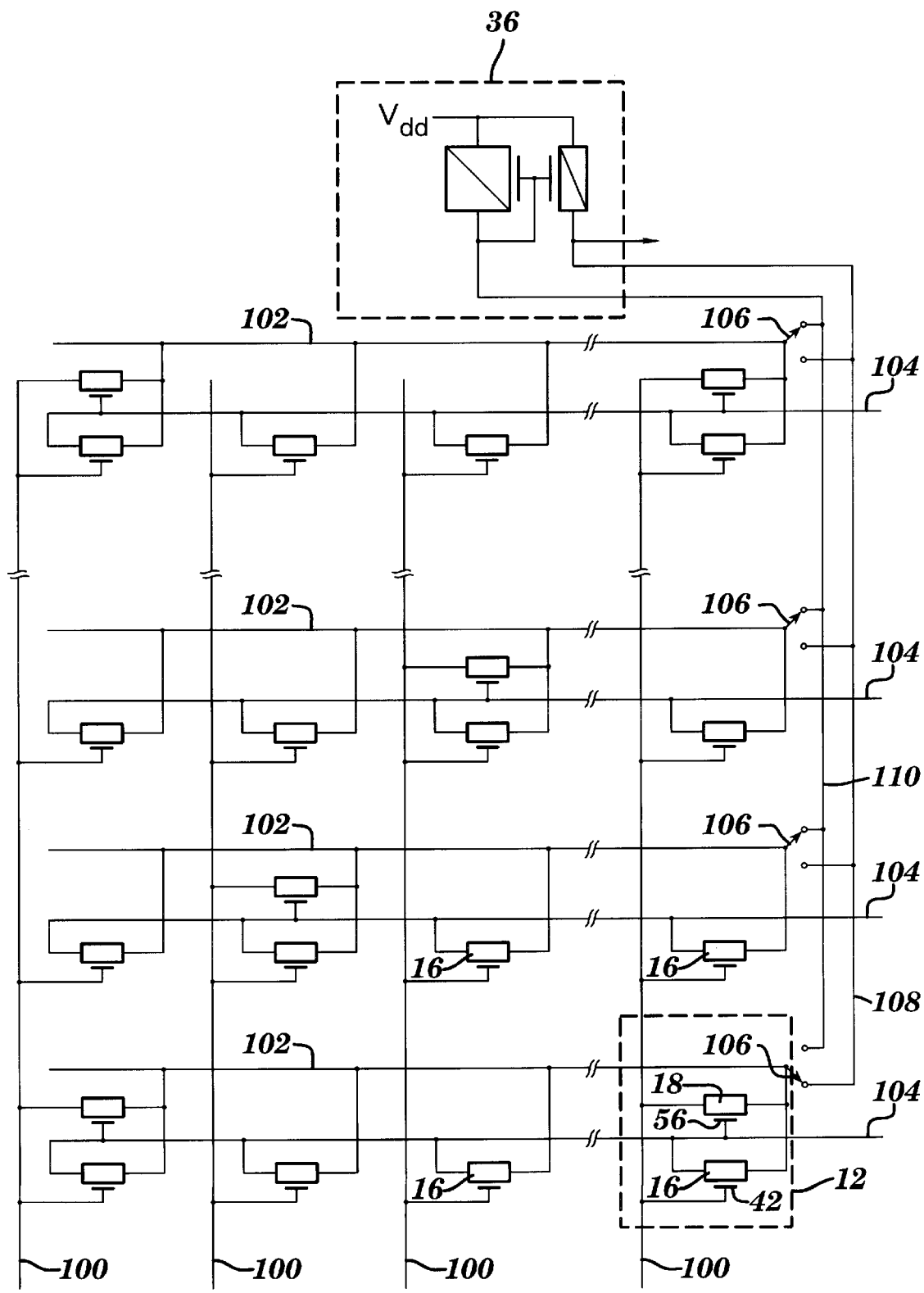

Second and third embodiments of the present invention are illustrated in detail in FIGS. 4 and 5, respectively. These embodiments share wires for even less wiring blockage, and become of interest in applications where a finer mesh of thermal detectors is desired. In such applications wiring blockage is a more important design issue.

In FIG. 4, the source of each local thermal sensor 16 and the gate 56 of each active background thermal sensor 18 are driven by the column decoder/driver 30 on lines 80, while the gate 42 of each local thermal sensor 16 and the source of each background thermal sensor 18 are driven by the column decoder/driver 30 on lines 82. Again, the output currents from the local thermal sensors are available on lines 50, and the output currents from all of the background thermal sensors are collectively provided at node 62 via lines 60.

In this embodiment, the functions of lines 46 and 58 of FIG. 3 have been combined in line 80. When line 80 is held at ground and line 82 is held a few hundred millivolts above ground, all of the background thermal sensors 18 in the selected column are disabled and all of the local thermal sensors 16 in the selected column are enabled. When line 82 is held at ground and line 80 is held a few hundred millivolts above ground all of the background thermal sensors 18 are enabled and the local thermal sensors 16 are disabled.

A plurality of FET switches 52 are used to selectively direct the output current on a single line 50 in a specific row of the array to a difference circuit 36. The FET switches 52 are individually driven by a gating signal provided by a row decoder/driver 32 on lines 54. The current output of the selected local temperature sensor 16 is provided to the difference circuit 36 on line 55.

Yet another embodiment of the present invention using shared lines is illustrated in FIG. 5. The gate 42 of each local thermal sensor 16 and the source of each background thermal sensor 18 in a column of the array are connected to a respective one of the column select lines 100. The output current from the drain of each local thermal sensor 16 in a row of the array is available on a respective one of the output lines 102. The gate 56 of each background thermal sensor 18 and the source of each local thermal sensor 16 in a row of the array are coupled to a respective one of the lines 104. The output current from each background thermal sensor 18 is also available on the output lines 102.

A plurality of switches 106 are used to direct the output current from a selected local thermal sensor 16 to an input of the difference circuit 36 on line 108, and to direct the output current from a plurality of background thermal sensors 18, which are not located in the same row in the array as the selected local thermal sensor 16, to a second input of the difference circuit 36 on line 110. As described above, the difference circuit 36 provides an output current corresponding to a temperature difference between a local temperature at the selected local thermal sensor and a background temperature of the integrated circuit.

The embodiment of FIG. 5 further extends the concept of shared functions on fewer selection lines. When a row line 104 is driven to ground and a column line 100 is driven a few hundred millivolts positive, the local thermal sensor 16 at the intersection of that row and column is enabled. In all other rows and columns where column line 100 is driven to ground and row line 104 is driven a few hundred millivolts positive, the background thermal sensors 18 at the intersections of these rows and columns are enabled. It is noted that in both the row and column of the selected local thermal sensor 16 all populated background sensors 18 are disabled. In FIG. 5, the switches 106 are set for the selection of the local thermal sensor 16 in the bottom left corner of the array.

The foregoing description of the present invention has been presented for purposes of illustration and description.

It is not intended to be exhaustive or to limit the invention to the precise form disclosed, and obviously many modifications, variations, and equivalents are possible in light of the above teaching. Such modifications, variations, and equivalents that may be apparent to a person skilled in the art are intended to be included within the scope of this invention as defined by the accompanying claims.

We claim:

1. An apparatus comprising:

an integrated circuit (IC) chip having a chip area;

a difference circuit;

a plurality of dual cells each including a local sensor and a background sensor, the dual cells disposed in at least a portion of the chip area;

at least one of the local sensors coupled to the difference circuit and providing a first input to the difference circuit, wherein the first input corresponds to a local temperature of the IC chip;

selected ones of the background sensors collectively coupled to the difference circuit and providing a second input to the difference circuit, wherein the second input corresponds to a background temperature of the IC chip; and the difference circuit outputting a signal based on a difference between the first input and the second input, the difference corresponding to a temperature difference between the local temperature of the IC chip and the background temperature of the IC chip.

2. The apparatus of claim 1, wherein the difference circuit includes an adjustable threshold system, and wherein the signal output by the difference circuit is dependent on a setting of the adjustable threshold system.

3. The apparatus of claim 1, wherein the first input to the difference circuit is a current proportional to the local temperature of the IC chip, and the second input to the difference circuit is a current proportional to the background temperature of the IC chip.

4. The apparatus of claim 1, further including a circuit for selectively coupling a single one of the local sensors to the difference circuit, wherein the first input to the difference circuit corresponds to the local temperature at said single one of the local sensors.

5. The apparatus of claim 1, wherein said plurality of dual cells are distributed in an X/Y array across the IC chip.

6. The apparatus of claim 5, further including a circuit for selectively coupling one of the local sensors in said X/Y array to the difference circuit, wherein the first input to the difference circuit corresponds to the local temperature at said one of said local sensors.

7. The apparatus of claim 1, further including a circuit for summing an output of said selected ones of the background sensors to provide the second input to the difference circuit.

8. In combination, an integrated circuit chip and an apparatus for sensing the temperature of the integrated circuit chip comprising:

a plurality of thermal sensors distributed on, and formed as a portion of, a surface of the integrated circuit chip, the plurality of thermal sensors including a plurality of local sensors each providing an output corresponding to a local temperature of the integrated circuit chip, and at least one background sensor for providing an output corresponding to a background temperature of the integrated circuit chip; and a circuit for comparing the output of a selected one of said plurality of local sensors to the output of the at least one background sensor to determine a temperature difference between the local temperature of the integrated circuit chip and the background temperature of the integrated circuit chip.

9. An apparatus according to claim 8, wherein the comparing circuit includes an adjustable threshold, and wherein the temperature difference output by the comparing circuit is dependent on a setting of the adjustable threshold.

10. The apparatus according to claim 8, wherein the output of each of said plurality of local sensors is a current proportional to the local temperature of the integrated circuit chip, and wherein said at least one background sensor comprises a plurality of background sensors, the collective output of which is a current proportional to the background temperature of the integrated circuit chip.

11. The apparatus of claim 8, further including a circuit for selectively coupling a single one of the plurality of local sensors to the comparing circuit, wherein the comparing circuit determines the temperature difference between the local temperature at said single one of the plurality of local sensors and the background temperature of the integrated circuit chip.

12. The apparatus of claim 8, wherein said plurality of thermal sensors are distributed in an X/Y array across the integrated circuit chip.

13. The apparatus of claim 12, further including a circuit for selectively coupling a single one of the plurality of local sensors in said X/Y array to said comparing circuit, wherein the comparing circuit determines the temperature difference between the local temperature at said single one of the plurality of local sensors and the background temperature of the integrated circuit chip.

14. A method for sensing temperature variations on an integrated circuit chip including the steps of:

determining a local temperature of the integrated circuit chip at a first plurality of locations;

determining a background temperature of the integrated circuit chip by collectively measuring a temperature of the integrated circuit chip at a second plurality of locations; and, comparing the local temperature at said first plurality of locations with the background temperature, wherein the results of the comparing step correspond to the temperature variations on the integrated circuit chip.

15. The method according to claim 14, further including the step of:

sequentially comparing the local temperature at each of said first plurality of locations with the background temperature to provide a temperature contour of said integrated circuit chip.

16. The method according to claim 15, further including the step of:

displaying the temperature contour of said integrated circuit chip.

17. The method according to claim 16, wherein said displaying step displays regions of different temperatures on the integrated circuit chip in different colors.

18. The method according to claim 14, further including the steps of:

determining whether the local temperature on an area of said integrated circuit chip exceeds the background temperature by a predetermined amount; and regulating an operating parameter of said integrated circuit chip to lower the local temperature in said area of said integrated circuit chip.

19. The method according to claim 14, wherein said step of determining a local temperature includes the step of:

provide a local thermal sensor at each of said first plurality of locations, each local thermal sensor providing a signal corresponding to the local temperature at one of said first plurality of locations.

20. The method according to claim 14, wherein said step of determining a background temperature includes the steps of:

providing a background thermal sensor at each of said second plurality of locations, each background thermal sensor providing a temperature signal corresponding to a temperature at one of said second plurality of locations; and combining the temperature signals provided by said background thermal sensors to provide a signal corresponding to the background temperature of said integrated circuit chip.

21. The method according to claim 14, further including the step of:

performing said comparing step while operating the integrated circuit chip under actual operating conditions.

\* \* \* \* \*